INVENTOR
DIDIER COSTES
BY Bacon & Thomas
ATTORNEYS

United States Patent Office 3,344,033
Patented Sept. 26, 1967

3,344,033
HANDLING APPARATUS FOR NUCLEAR
REACTOR REFUELING FACILITY
Didier Costes, Paris, France, assignor to Commissariat a
l'Energie Atomique, Paris, Seine, France
Filed Apr. 2, 1965, Ser. No. 445,144
Claims priority, application France, Apr. 9, 1964, 970,407
9 Claims. (Cl. 176—30)

ABSTRACT OF THE DISCLOSURE

An inclined arm and guide track are permanently mounted inside of the servicing chamber of a reactor pressure vessel and are rotatably driven about their upper end. A handling machine with a fuel element grab may be moved along the guide track or lifted upwardly out of the servicing chamber and into an operating chamber by a hoist and cable arrangement. A grab actuated brake locks the handling machine to the arm during refuelling and a shield plug carrying cable pulleys and, if desired, a short section of guide track is supported in the vertical servicing passageway and on the upper end of the arm.

---

This invention is concerned with a refuelling facility for heterogeneous reactors of the type comprising gas-cooled vertical channels and a servicing chamber, wherein said facility is so designed that the fuel which is in the form of elements of moderate weight can be inserted from the servicing chamber into the channels of the reactor core and withdrawn first from said core then from said servicing chamber even while the reactor is operating at full pressure.

The term "servicing chamber" is employed to designate the space formed within the reactor vessel which provides both resistance to pressure and biological shielding and which will be referred to hereinafter as the pressure vessel. The said servicing chamber is separated from the reactor core by a shield wall for attenuating radiation, said wall being pierced by pluggable openings which provide access to the core channels. Different equipment units can be placed within said servicing chamber and in particular the fuel element handling unit or, in other words, that part of the refuelling facility which effects the insertion of fresh fuel elements within the core channels and the withdrawal of spent fuel elements therefrom.

The presence of a servicing chamber endows nuclear reactors with a certain number of advantages, especially the following: ease of circulation of the fuel elements from the core channels to the handling unit since a passageway can be formed in the grid plate in alignment with each core channel (whereas provision cannot be made for such a large number of bore-holes through the reactor vessel); at the price of maintaining the temperature of the servicing chamber at a relatively low value (of the order of 60° C.), the possibility of utilizing conventional mechanisms and of discharging the fuel elements after these latter have been stored for a sufficient period of time to ensure that they have lost the major part of their activity and that the amount of heat generated therein is too small to require any cooling during the discharge of said fuel elements to the irradiated fuel storage pond.

The devices for performing handling operations within the servicing chamber are usually designed to sweep in polar co-ordinate paths, said devices accordingly comprising at least one radial arm which is rotatable about the axis of the reactor and a loading machine which is movable in translational motion along said arm, the combination of movements of rotation and translation resulting in the possibility of bringing the machine directly above any given point of the grid plate.

Among the devices of the above-mentioned type which have already been designed and built, reference can be made to the apparatus described in U.S. Patent No. 3,205,143.

The handling apparatus referred to comprises a beam which is mounted within the servicing chamber and adapted to rotate about an axis which is parallel to the fuel channels, means for driving said beam in rotation, an assembly designed to move along the beam and carrying a grappling member which is movable parallel to the axis of rotation of said beam, first and second driving means disposed outside of the pressure vessel within an operating chamber which is placed in communication with the servicing chamber, and first and second flexible means traversing the pressure vessel substantially along the axis of rotation of the beam and coupling respectively the moving assembly to the first means and the grappling member to the second means.

This invention is directed to the design concept of a fuel handling apparatus which fulfills practical requirements more effectively than handling devices of the prior art, particularly insofar as said apparatus makes it possible to remove from the servicing chamber at least the major part of the equipment contained therein except of course for the rotary beam and stationarily fixed members about which said beam rotates.

A better understanding of the invention will be gained from a perusal of the following description of forms of embodiment which are given by way of example only and not in any limiting sense. Reference is made in the following description to the accompanying drawings, in which.

The handling apparatus as described and illustrated in FIGS. 1 to 6 is incorporated in a facility for re-charging fuel elements into the channels of a nuclear reactor of the solid-moderator type which is cooled by a gas (usually carbon dioxide gas) and provided with a servicing chamber.

Figure 1:
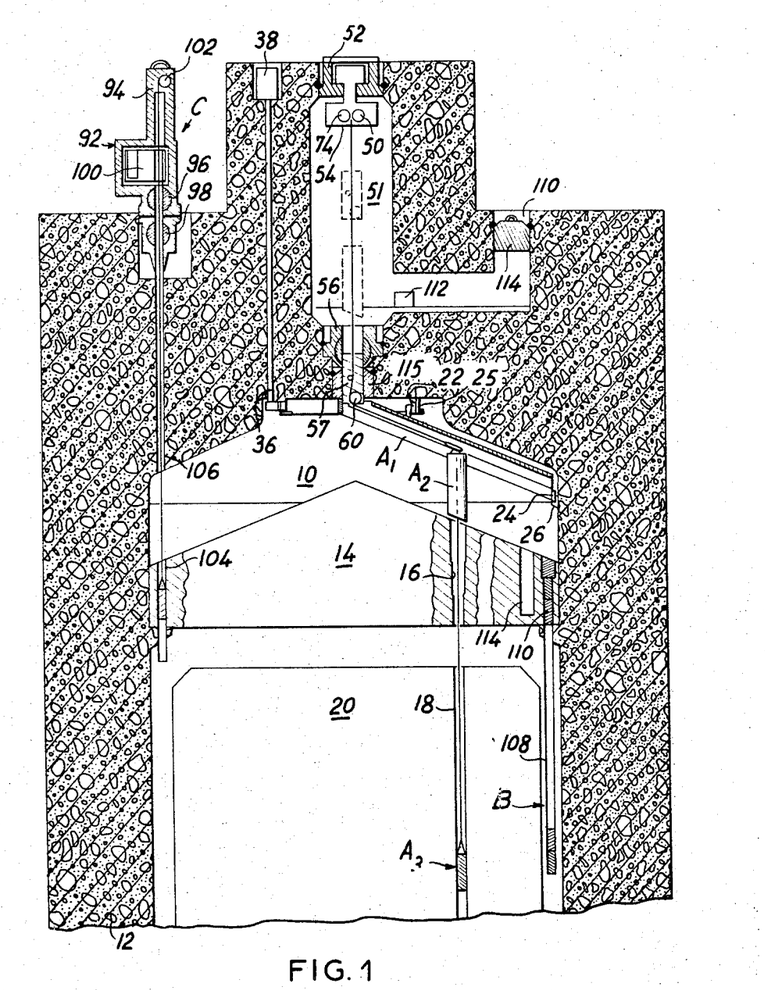
FIG. 1 is a diagrammatic cross-sectional view, taken on a plane passing through the axis, of the top portion of a reactor which is equipped with the handling apparatus according to the invention.

The complete facility is illustrated diagrammatically in FIG. 1, which shows the servicing chamber 10 of the reactor as delimited by a pressure vessel 12 and a bottom grid plate 14, with pluggable guide tubes such as the tube 16 extending through said grid plate and providing access to the vertical channels such as the channel 18 which are located within the reactor core 20.

The said facility can be considered as being constituted by a handling unit A, a storage unit B and an insertion and withdrawal unit C. The handling unit, which will be described first, comprises: a beam or arm $A_1$ which can be oriented about a vertical axis together with its driving mechanism; a machine $A_2$ which can be displaced along the beam together with its driving mechanism; an assembly $A_3$ which consists of a grappling member carried by a carriage or trolley and adapted to move vertically wiht respect to said carriage so as to penetrate within the core channels, and its driving mechanism.

Figure 2:
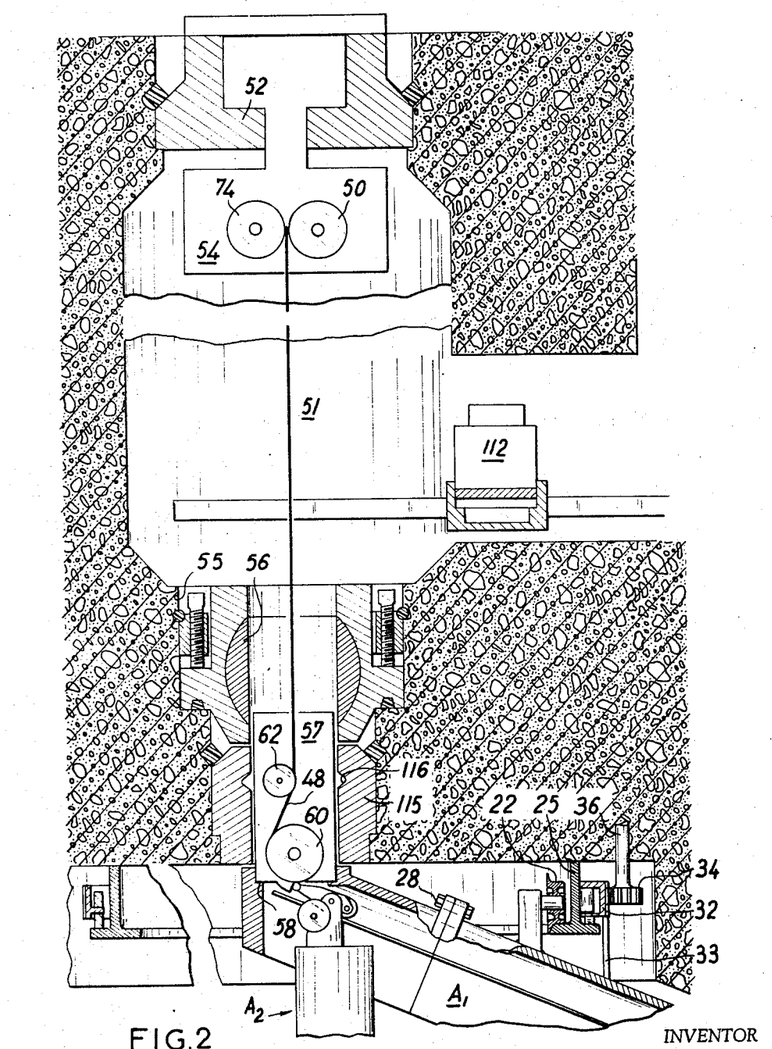
FIG. 2 is a diagrammatic view on a large scale and in cross-section taken on the same plane as that of FIG. 1, showing the top portion of the handling apparatus.

The different devices which constitute the refuelling facility will now be described in turn. The beam $A_1$ and its driving mechanism are illustrated in FIGS. 1 and 2. The beam $A_1$ is fitted with runner-wheels 22 and 24 which run on two circular rails 25 and 26, said rails being both fixed to the pressure vessel wall. The beam which is illustrated in the drawings consists of a sectional member (as shown in FIG. 4) which is preferably made up of two parts assembled together by means of bolts 28 (as shown in FIG. 2) so as to permit the assembly of the radially outer portion while leaving the central portion free.

Figures 4, 5, 6:
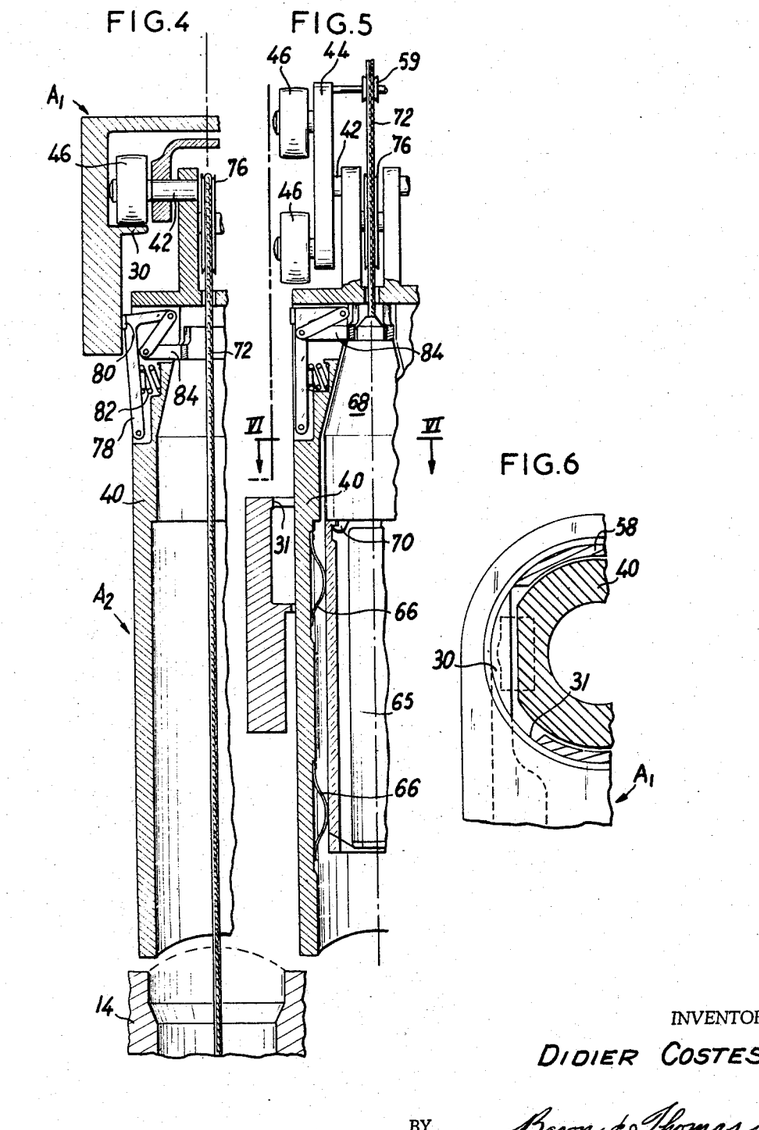
FIG. 4 is a view in half-section taken along the line IV—IV of FIG. 3.
FIG. 5, which is similar to FIG. 4, shows the handling machine which is suspended from its control cable, the grappler being lifted to the full extent.
FIG. 6 is an overhead view in cross-section taken along the line VI—VI of FIG. 5 showing the insertion of the handling machine within the arm.

As shown in FIG. 4, the beam $A_1$ has a U-shaped cross-section which is provided half-way up with two internal flanges such as the flange 30 forming the tracks on which the machine $A_2$ is supported; the top portion of the beam is pierced by an opening 31 which is centered on the axis of rotation and which is intended to permit the machine $A_2$ to pass through, as shown in FIGS. 5 and 6. Beneath the opening 31, the flanges 30 are of smaller width in order to permit the machine to pass; since the portion of smaller width of the flanges 30 is subjected to only occasional stresses at the time of introduction and withdrawal of the machine, this local weakening is acceptable.

The beam $A_1$ is driven in rotation by means of a ring-gear 32 which is coupled to the beam by tie-rods 33 and meshes with pinions such as the pinion 34 which are driven from the exterior of the pressure vessel by shafts 36 which are parallel to the axis of the reactor, said shafts being in turn driven by motors such as the motor 38 as shown in FIG. 1, while seals (not shown) are interposed between these shafts and the pressure vessel wall.

The beam $A_1$ of the apparatus in accordance with the invention has a downward slope towards the exterior which is sufficient to initiate the downward motion of the carriage under the action of its own weight as and when the control device is released. The top face of the grid plate 14 advantageously has the shape of a cone which is homothetic with the cone swept by the flanges 30 and which is located at a distance from said flanges which corresponds to the overall vertical dimensions of the handling machine $A_2$.

Figure 3:
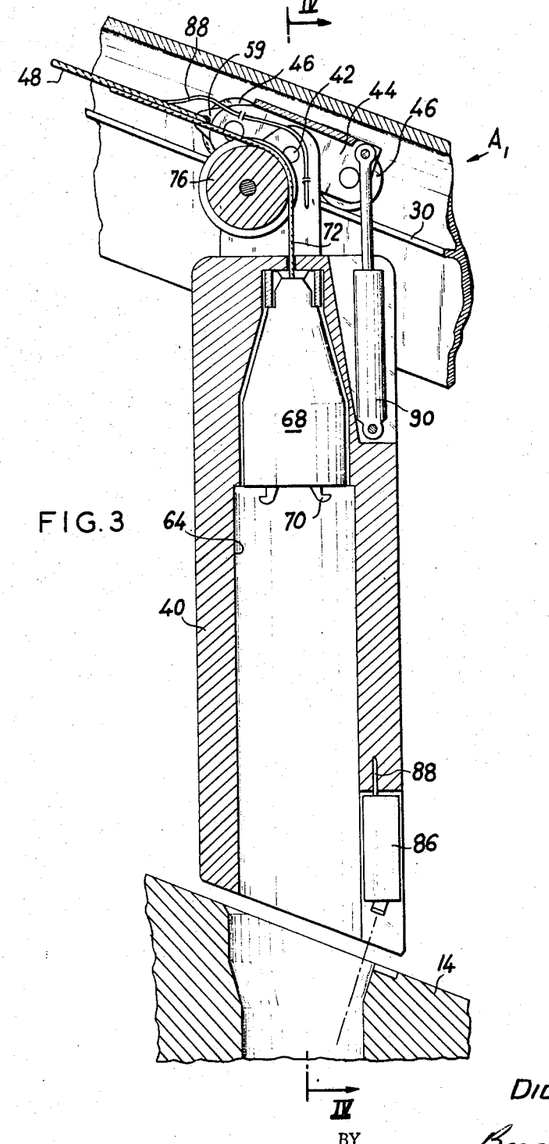
FIG. 3 is a detail sectional view taken on the same plane as that of FIGS. 1 and 2 showing the machine of said handling apparatus.

The handling machine $A_2$ is illustrated in FIGS. 3, 4 and 5 while its operating mechanism is illustrated in FIGS. 1 and 2. The handling machine consists basically of a bell-housing 40 which is suspended by means of pivot-pins 42 from a carriage portion or trolley 44 fitted with four runner-wheels 46 which are adapted to roll on the flanges 30. As will be explained hereinafter, said handling machine can be withdrawn from the servicing chamber so that, in such a case, only the beam $A_1$ remains therein. To this end, the carriage has a configuration which is inscribed in projection within that of the bell-housing when this latter is suspended from the cable 48 while the contour of the runner-wheels has an outwardly projecting portion.

The operating mechanism of the handling machine is intended to effect the translational motion of this latter along the flanges 30 of the arm and comprises the cable 48 which is moved by a driving unit consisting of a cable hoist 50 which is located outside the servicing chamber.

The displacement of the handling machine $A_2$ towards the axis (centripetal motion) is carried out as a result of traction applied to the cable 48 (as shown in FIGS. 1, 2 and 3). The displacement of the machine $A_2$ from the axis towards the exterior (centrifugal motion) is effected under the action of gravity simply by releasing the cable 48.

The cable hoist 50 is disposed within an operating chamber 51 which is normally at the same pressure as the servicing chamber (as shown in FIGS. 1 and 2), said operating chamber being formed within the pressure vessel 12 and separated from the atmosphere by means of a pressure-resistant plug 52 which is shown diagrammatically. Said plug 52 carries a frame 54 for supporting the cable hoist 50, said frame being rotatably mounted so as to be driven in synchronism with the arm $A_1$ by means of a transmission mechanism which has not been shown in the drawings.

The operating chamber 51 opens into the servicing chamber 10 through an axial duct 55 of sufficiently large diameter to provide access for personnel as well as for the equipment required for maintenance operations and if necessary for the initial construction of the reactor. The bottom portion of said duct is lined with a bushing 115 which is fixed in leak-tight manner to the walls and the internal diameter of which permits the handling machine $A_2$ to pass therethrough; and also permits the entry of a biological shield plug 57 which remains inside said bushing and is capable of rotating therein, said plug being carried by the bearing surface 58 which partially surrounds the opening 31 of the beam $A_1$. The top portion of the duct 55 is fitted with an isolating valve 56 which is demountable and remote-controlled and permits of leak-tight closure of the duct when this latter is not fitted with the plug 57 and the control cables of the handling machine $A_2$.

One of the extremities of the cable 48 is fixed to a point 59 of the carriage 44 in alignment with the axis of the runner-wheels. Starting from the point 59 shown in FIG. 3, the cable 48 extends parallel to the flanges 30 up to a guide pulley 60 rotatably mounted on the biological shield plug 57 which rests on the bearing surfaces 58 of the beam $A_1$ and rotates with this latter; the said cable then passes over a second guide pulley 62 which is carried by the plug and extends vertically up to the cable hoist 50 substantially in the center-line of the facility.

As shown in FIG. 6, the transverse cross-section of the bell-housing has a truncated circular contour so as to permit said bell-housing to pass through the opening 31 of the beam and between the flanges 30. The internal bore 64 is of such diameter that the remaining wall thickness is sufficient to provide partial biological shielding against the radiation emitted by an irradiated fuel element 65 which is placed inside the machine, as shown in FIG. 5. Flexible centering members 66 are preferably provided for the purpose of maintaining the fuel element substantially centered. The bore itself is of sufficient diameter to accommodate plugs of larger diameter for sealing off the guide tubes 16.

The grappling unit which is carried by the machine is illustrated in FIGS. 3 and 5 while the grappler control mechanism is shown more clearly in FIG. 2. This unit consists of a grab 68 of any suitable type of substantially circular shape in cross-section and having a diameter such that said grab is guided by the top portion of the bore 64 formed in the bell-housing; said grab is fitted with engagement hooks 70. The upward movement of the grab is carried out under the action of a control mechanism which will now be described while the downward movement thereof takes place under the action of gravity as and when the control mechanism is released.

It will be assumed in the following description that the grab is fitted with a system for controlling the opening and closing of the hooks by inertia and consequently requires only a holding cable. Should it prove desirable to connect to the grab two cables having a differential action, the mechanism described hereunder would in that case have to be duplicated.

The control mechanism referred to comprises a cable 72 controlled by means of a hoist 74 which is mounted on the same frame 54 as the hoist 50. From the point at which said cable is attached to the grab 68 to the hoist 74, the cable 72 passes over a guide pulley 76 carried by the bell-housing and having a diameter which is such that the cable leaves said pulley at the level of the pivot-pin 42, extends along the beam up to the guide pulleys which are mounted on the same pins as the pulleys 60 and 62 and finally follows the axis of the reactor up to the hoist 74. The cable hoists 50 and 74 must be synchronized when the hoist 50 is started up in order to ensure that the position of the grab does not vary inside the bell-housing when, the grab being in the top position as shown in FIG. 5, the handling machine $A_2$ is displaced along the beam as a result of the operation of the hoist 50.

In order to prevent the swinging motion of the bell-housing about the pin 42 at which it is pivoted to the carriage, a damping member 90 is preferably interposed between the bell-housing and the carriage, as shown in FIG. 3.

As will be apparent, it is essential to ensure that the efforts exerted on the pulley 76 each time the grab 68 is actuated do not result in a displacement of the machine $A_2$. A number of solutions can be adopted either separately or in combination in order to satisfy this condition. A first solution consists in setting the beam at an angle of slope $\alpha$ with respect to the horizontal which is such that the following relation is always complied with:

$$P' > P \frac{1 - \sin \alpha}{\alpha}$$

wherein P designates the maximum tractive force which the cable 72 is designed to exert on the handling machine at the time of operation of elements by means of the grab, and P' is the weight of the complete machine.

A second solution which is preferably employed at the same time as the preceding with a view to providing for the possibility of jamming of the fuel cartridge within a reactor channel, in which case a higher tractive effort than usual is necessary, consists in providing the handling machine with a system which produces a braking action on the beam and which is operative at all times except when the grab 68 is in the top position. The system which is illustrated by way of example in FIGS. 4 and 5 consists of two levers 78 carrying friction shoes 80 which are applied by springs 82 against the flanges of the beam $A_1$. Said levers 78 fold back by means of scissors 84 and free the bell-housing when the grab 68 is brought back to the top position and lifts the scissors, as shown in FIG. 5.

The handling machine $A_2$ is adapted to carry other ancillary devices: FIG. 3 shows a television camera 86 which is mounted on the bell-housing close to the grid plate and fitted with a cable 88 for transmitting an image of the guide tube inlet and also of any reference or guide marks which may be inscribed thereon. The proximity of the camera to the zone to be observed ensures the transmission of an image of satisfactory quality notwithstanding the presence of convection currents in the high-pressure carbon dioxide gas.

Should it prove unnecessary to transmit the large amount of information which is represented by a television picture, it can in that case prove sufficient to provide one or a number of photoelectric cells for the transmission of information. Said photoelectric cells can be employed for ensuring automatic handling by means of a system of the type described, for example, in French Patent No. 1,347,042 as filed on Sept. 26, 1962 in the name of Commissariat a l'Energie Atomique.

The system B for storage of fresh or spent fuel elements will be briefly described hereunder as well as the system C for the removal of spent fuel elements and insertion of fresh fuel elements.

System C can be of any conventional type. In the form of embodiment which is illustrated in FIG. 1, said system comprises a series of movable handling machines 92 each consisting of a leak-tight vessel 94, a rotary drum 100 for the storage of fuel elements, a cable hoist 102 and a shaft or well which is closed at the bottom by a valve 96. The pressure vessel 12 is provided with a series of vertical tunnels 106 which are aligned with storage channels such as the channel 104 formed within the grid plate 14 said tunnels being fitted at the top ends with valves 98. The handling machines 92 can be fixed above the tunnels 106 and placed in communication with the servicing chamber by opening the valves 96 and 98. Said handling machines 92 thus permit the possibility either of inserting fresh fuel elements within the wells 104 or the removal of spent elements. This process is commonly employed, however, and need not therefore be dwelt upon.

Handling machines 92 can also be employed for the purpose of introducing in the well 104 and withdrawing therefrom a transporter tube containing clean or spent fuel elements. The machine does not in such a case comprise a rotary drum and is reduced to a simple housing, thus resulting in a highly simplified design. In addition, this solution permits the simultaneous insertion or withdrawal of all the fuel elements contained in one well without any appreciable increase in the diameter of this latter and no longer makes it necessary in order to handle the fuel elements to make use of grooves formed in the graphite sleeves with which fuel elements are usually provided.

The storage system B consists of wells such as that which is designated by the reference 104 and other wells such as 108 which are disposed vertically at the periphery of the grid plate 14 and which can also extend around the core 20; the wells 104 are located vertically beneath the tunnels 106. The wells 104 and 108 open into the servicing chamber 10 and can accommodate fresh fuel elements or even spent fuel elements which emit radioactive radiation and heat. The cooling of the wells is effected by a flow of fresh gas which is circulated downwardly from the servicing chamber and terminates at the point of the heat-transporting circuit in which the pressure is lowest. The said gas flow can be controlled by replaceable diaphragms (not shown) which are placed at the bottom ends of the wells.

It is preferable to provide more powerful cooling within the wells 104 in which the spent fuel elements are temporarily stored prior to removal from the pressure vessel; said wells can therefore be of smaller depth as shown in FIG. 1 or else they can be heat-insulated with respect to the heat-transporting circuit.

In order to permit human activities within the servicing chamber, it is an advantage to place biological shield plugs such as the plug 110 at the top ends of the wells 104 and especially the wells 108; these plugs can be operated either by means of the machine $A_2$ or (subject to the usual precautions) by a first operating crew.

The operating chamber 51 which permits the possibility of carrying out servicing operations on mechanisms while the reactor is in operation can be provided with a manhole 110 which is normally sealed by a leak-tight plug 114. There is placed within said chamber 51 a temporary stand-by plug 112, for example of the type described in French Patent No. 1,366,741 as filed on Aug. 16, 1961 in the name of Commissariat a l'Energie Atomique, said stand-by plug being designed to seal off a conduit by expansion of a flexible ring and is moved axially by means of a simple gripping device. Said plug 112 can be placed by the machine $A_2$ through the valve 56 inside the bushing 115 and can be anchored to the walls of this latter by virtue of the groove 116. After the machine $A_2$ has been lifted again, the pressure within the chamber 51 can be reduced and the valve 56 can be replaced for maintenance purposes while the reactor is in operation. The reverse sequence of operations is carried out for the purpose of removing the plug 112.

The cable hoist 50 serves to lift the handling machine $A_2$ and the biological shield plug 57 up to the position in which they are shown in broken lines in FIG. 1. The removal of the plug 57 is effected automatically when the handling machine has been lifted beyond the position in which the carriage comes into contact with the plug. Once these two units are in the position which is shown in the figure and the valve 56 is closed, there only remain inside the servicing chamber 10 sturdy members which are not subject to breakdown or failure.

The operation of the device in accordance with the invention during re-loading of a fuel channel will now be briefly described; the handling machine $A_2$ is brought into position, as a result of the rotation of the beam $A_1$ and the adjustment of the radial position of said machine on said beam, opposite the guide tube which corresponds to the channel to be serviced. In order to carry out this operation, it is apparent that control rod drive mechanisms must not pass through the servicing chamber, which therefore prohibits the use of control motors placed outside the pressure vessel and coupled to the control rods by means of cable passing through the servicing chamber. However, since said servicing chamber is maintained at low pressure, it is possible to place the control rod drive motors within recesses of the grid plate 14.

Once the handling machine $A_2$ is in position, the cable hoist 74 is alone actuated in order to engage by means of the grab 68 the first biological shield plug which serves to seal off the guide tube, then the grab carrying the plug is returned to the position which is shown in FIG. 5. The machine is then brought opposite a recess such as 114 (as shown in FIG. 1) in which the grab deposits the first plug. The handling machine $A_2$ is once again actuated so as to remove and store in turn all of the plugs and is then inserted within the core channel 18 so as to grip the first fuel element, and then returned to the position shown in FIG. 5 together with said fuel element 65. As a result of the displacement of the machine and operation of the grab, said fuel element is brought into a well 104 or 108, as well as the following fuel elements.

The handling machine $A_2$ will then take from one of the wells 104 which is placed in alignment with one of the tunnels 106 fresh fuel elements and these latter are inserted by said machine within the core channel 18. A certain number of the fuel elements which were previously stored can also be re-inserted for passing a second time into the reactor, whereupon the plugs which are stored in the recesses such as 114 are replaced in position.

The fuel elements are stored in the wells 108 for the time which is necessary to ensure that their radioactive and thermal power levels should become compatible with the means for their removal and are then transported by the machine $A_2$ up to a well 104, then discharged by the corresponding handling machine 92.

In the event of jamming of a fuel element within the bell-housing, said bell-housing can be lifted up into the operating chamber 51 together with the biological shield plug 57; this chamber is then closed by means of the valve 56 which is remote-controlled and brought to atmospheric pressure so as to permit of a servicing operation which may entail the need to remove the entire bell-housing together with its contents by means of a discharge flask. The wall of the bell-housing has a minimum thickness which is sufficient to provide the operator with partial protection against the radiaton of the fuel element contained therein and to permit a brief operation, for example with a view to completing this protection.

FIGS. 7 to 10 show an alternative form of the apparatus which is illustrated in FIGS. 1 to 6 and, for the sake of greater clarity, the corresponding components of the two forms of embodiment are given the same reference numerals to which is assigned the prime index in FIGS. 7 to 10. The alternative form which is illustrated in FIGS. 7 to 10 must be considered as preferable. It will in fact be seen that, by virtue of this last-mentioned form of embodiment, the bell-housing is maintained on its path without any swinging motion and, in addition, the operation involving the insertion of the handling machine within the servicing chamber is made less difficult to perform.

The device of FIGS. 7 to 10 comprises a rotating arm or beam $A'_1$ and a handling machine $A'_2$ which is displaceable along the beam. However, as can be seen from FIGS. 7 and 10, the flanges 30' which form guide tracks do not extend up to the axis but stop short at the level of the periphery of the plug 57. Said plug is again shown as resting on a bearing surface 58' of the beam (FIG. 7) with which said plug rotates.

Figure 7:
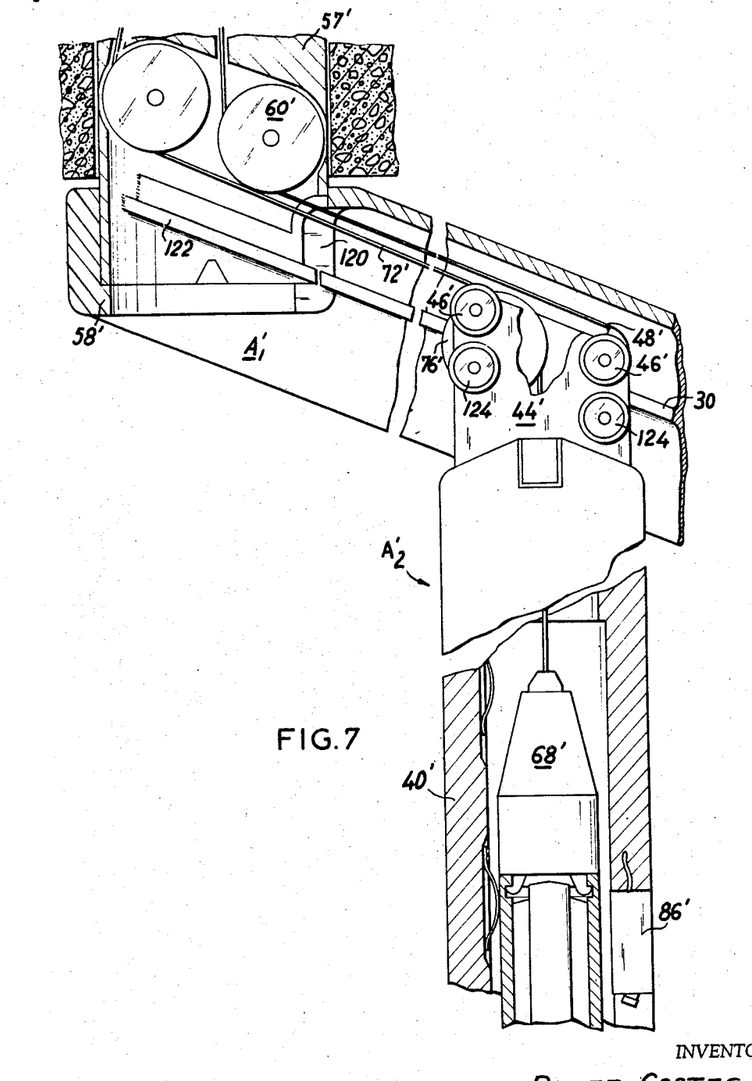
FIG. 7, which is similar to FIG. 3, is a diagrammatic view on a large scale showing the top portion of the beam and of the handling machine according to an alternative form, this view being taken in fragmentary cross-section on a vertical plane.
Figure 8:
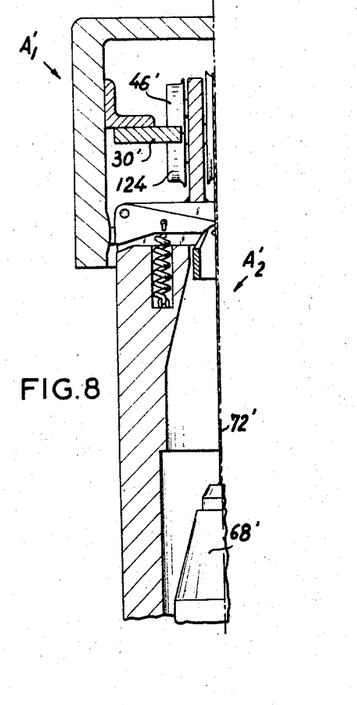
FIGS. 8 and 9, which are similar to FIG. 4, are half-sectional views showing the handling machine of the alternative form of embodiment of FIG. 7, wherein the grab is shown in the lowered position in FIG. 8 and in the raised position in FIG. 9.
Figure 9:
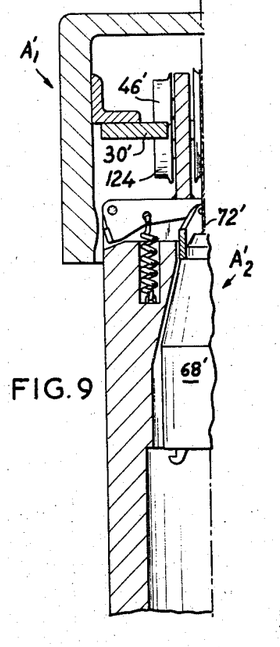

The bottom portion of the plug 57' is of annular shape and has a recessed portion 120 in oppositely facing relation to the beam. There are mounted in the annular recess two rails 122 which are located in the line of extension of the flanges 30' when the plug is in position.

Figure 10:
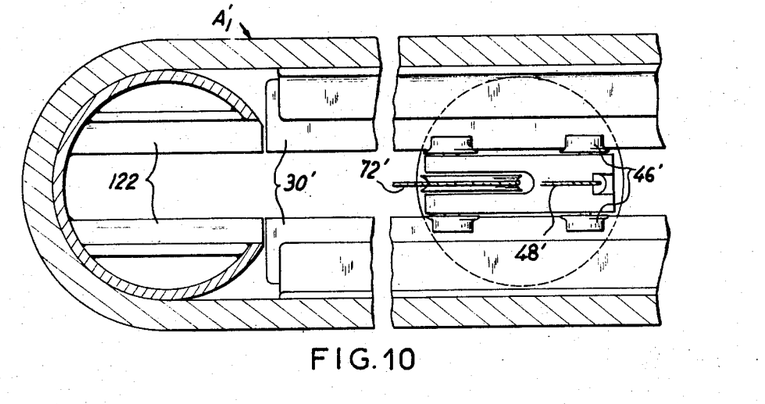
FIG. 10 is an overhead view in cross-section taken along the line X—X of FIG. 7.

The bell-housing 40' and carriage 44' can constitute a single unit fitted with four pairs of wheels 46' and 124 which run on each side of the flanges 30' or, when the machine is in the top position thereof, on each side of the rails 122. The guide pulleys are placed in such a manner as to make it possible to bring the handling machine into position opposite the opening. Once in this position, the handling machine can be moved into the operating chamber together with the plug 57' while a tractive effort continues to be exerted on the cables 72' and 48'.

In short, this form of embodiment differs from the first in that the unit which is displaceable along the beam and which is designed as a single unit instead of being subdivided into a bell-housing and a carriage, grips the flanges or rails along which it travels both when said unit moves along the beam and when said unit is either lifted or lowered together with the plug.

What I claim is:

1. In a nuclear reactor having a pressure vessel and biological shield, fuel elements located in vertical channels of the core, a servicing chamber located within the reactor pressure vessel and biological shield and disposed vertically above the core, a passageway extending vertically upwardly from the servicing chamber and located above the central portion of the core, and means for circulating a coolant gas in said channels; a refuelling apparatus, comprising: an arm permanently mounted in said servicing chamber for rotation about a vertical axis which is substantially coextensive with the axis of said passageway; drive means extending into said servicing chamber and connected with said arm for rotating it about said axis; a guide track rigid with said arm and extending outwardly and inclined downwardly from said axis toward the side wall of the servicing chamber; a handling machine adapted to be moved vertically at said axis between an operative position supported in said servicing chamber by said track and an inoperative position raised out of said servicing chamber through said passageway; said handling machine, when in said operative position being supported by said track for rotation therewith for movement therealong between said axis and the outer end of the track; driving means located outside of said servicing chamber and connected with said handling machine for moving it between said operative and said inoperative positions and for moving it upwardly and inwardly along said inclined track relative to said axis and for controlling outward and downward movement of said handling machine relative to said axis due to gravitational force acting thereon and for holding said handling machine in fixed position at any desired point along said track, said handling machine including a grab movable vertically, when said handling machine is disposed in said servicing chamber between a raised position where it is wholly disposed in said servicing chamber and lowered positions for placing and removing the reactor fuel elements; and control means connected with said grab for lifting it from a lowered to a raised position and for controlling the lowering of the grab from a raised to a lowered position and for holding it in selected position.

2. In a nuclear reactor refuelling apparatus according to claim 1, including a shield plug adapted to be positioned in said passageway when said handling machine is in said operative position; guide pulley means mounted on said shield plug; and means for supporting said shield plug in said passageway, said driving means including flexible, non-extensible cable means passing through said passageway and over said guide pulley means.

3. In a nuclear reactor refuelling apparatus according to claim 2, said means for supporting said shield plug comprising a bearing surface on said arm concentric with said axis, said plug, when seated on said bearing surface, being rotatable with said arm about said axis.

4. In a nuclear reactor refuelling apparatus according to claim 3, said shield plug including a short section of guide track which is in alignment with the guide track rigid with the arm when the shield plug is seated on said bearing surface.

5. In a nuclear reactor according to claim 2 including an operating chamber formed inside the pressure vessel and biological shield and communicating with said servicing chamber through said passageway, said refuelling apparatus driving means and said control means being located in said operating chamber, said control means including flexible, non-extensible cable means passing through said passageway and over said shield plug guide pulley means, said shield plug and said handling machine with said grab being movable as a whole through said passageway between said operative position and said inoperative position located in the operating chamber.

6. In a nuclear reactor refuelling apparatus according to claim 1, said handling machine comprising a carriage; a bell-housing pivotally connected to and depending from said carriage; pulley means mounted on said bell-housing above the upper end of the grab, and damping means connected between said carriage and said bell-housing, said control means including flexible, non-extensible cable means passing over said bell-housing pulley means.

7. In a nuclear reactor refuelling apparatus according to claim 1, said handling machine comprising a carriage, a bell-housing connected to and depending from said carriage, said grab being received within said bell-housing when in said raised position, braking means carried by said bell-housing and engageable with said arm for holding said bell-housing and said carriage in position on the arm, resilient means normally moving said braking means into the engaged position, and means for releasing said braking means engaged by said grab when it is in said raised position.

8. In a nuclear reactor refuelling apparatus according to claim 1, said handling machine comprising a carriage; a bell-housing depending from said carriage and connected thereto; and pulley means mounted on said bell-housing, said control means including flexible, non-extensible cable means passing over said bell-housing pulley means, said guide track having an inclination such that the tractive efforts exerted on the cable of said control means in normal operation are limited to a value which is lower than the efforts due to the forces of gravity which bias the handling machine outwardly from said axis.

9. In a nuclear reactor refuelling apparatus according to claim 1, said driving means and said control means each including flexible, non-extensible cable means passing through said passageway; pulley means mounted on said handling machine, said control means cable passing over said pulley means, said guide track being inclined substantially according to the equation $$P' > P \frac{1 - \sine a}{a}$$

wherein P designates the maximum tractive force which the driving means is designed to exert on the handling machine at the time of operation of elements by said grab, P' designates the weight of the complete handling machine, and $a$ designates the angle between the guide track and the horizontal.

References Cited
UNITED STATES PATENTS

| | | | |
|---|---|---|---|
| 3,165,212 | 1/1965 | Gerard | 176—30 |
| 3,179,569 | 4/1965 | Fortescue et al. | 176—30 |
| 3,205,143 | 9/1965 | Lemesle et al. | 176—30 |

L. DEWAYNE RUTLEDGE, *Primary Examiner.*